United States Patent
Murata et al.

(10) Patent No.: US 8,688,950 B2
(45) Date of Patent: Apr. 1, 2014

(54) MAINFRAME STORAGE APPARATUS THAT UTILIZES THIN PROVISIONING

(75) Inventors: Kazuhiro Murata, Odawara (JP); Hisaharu Takeuchi, Odawara (JP); Junichi Muto, Odawara (JP); Akihiro Mori, Odawara (JP); Kazue Jindo, Odawara (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 12/742,581

(22) PCT Filed: Apr. 27, 2010

(86) PCT No.: PCT/JP2010/003023
§ 371 (c)(1),
(2), (4) Date: May 12, 2010

(87) PCT Pub. No.: WO2011/135618
PCT Pub. Date: Nov. 3, 2011

(65) Prior Publication Data
US 2011/0320714 A1 Dec. 29, 2011

(51) Int. Cl.
*G06F 12/00* (2006.01)

(52) U.S. Cl.
USPC .......................................... 711/203; 711/162

(58) Field of Classification Search
None
See application file for complete search history.

(56) References Cited

U.S. PATENT DOCUMENTS

| | | | |
|---|---|---|---|
| 2004/0230766 A1* | 11/2004 | Cameron | 711/203 |
| 2007/0067588 A1* | 3/2007 | Kano et al. | 711/162 |
| 2008/0147961 A1 | 6/2008 | Seki et al. | |
| 2009/0144732 A1* | 6/2009 | Tanaka | 718/1 |
| 2009/0187730 A1* | 7/2009 | Mori et al. | 711/207 |

FOREIGN PATENT DOCUMENTS

| | | |
|---|---|---|
| EP | 1936488 A2 | 6/2008 |
| EP | 1970831 A2 | 9/2008 |
| JP | 2008-146574 | 6/2008 |

* cited by examiner

*Primary Examiner* — Sean D Rossiter
(74) *Attorney, Agent, or Firm* — Brundidge & Stanger, P.C.

(57) ABSTRACT

Each actual page inside a pool is configured from a plurality of actual tracks, and each virtual page inside a virtual volume is configured from a plurality of virtual tracks. A storage control apparatus of a mainframe system has management information that includes information denoting a track in which there exists a user record, which is a record including user data (the data used by a host apparatus of a mainframe system). Based on the management information, a controller identifies an actual page that is configured only from tracks that do not comprise the user record, and cancels the allocation of the identified actual page to the virtual page.

11 Claims, 13 Drawing Sheets

TRACK BITMAP

MAINFRAME STORAGE APPARATUS THAT UTILIZES THIN PROVISIONING

TECHNICAL FIELD

The present invention relates to storage control in a mainframe system.

BACKGROUND ART

A storage apparatus that utilizes Thin Provisioning (also called Dynamic Provisioning) is known. This storage apparatus is an open system storage apparatus (hereinafter, OP storage). The OP storage generally provides a virtual logical volume (hereinafter, virtual volume) configured from a plurality of virtual pages, and comprises a pool configured from a plurality of actual pages. In the case of a write of user data (data that a host apparatus (for example, an application program executed on the host apparatus) uses) to a virtual page, the storage apparatus allocates an actual page from the pool to the write-destination virtual page, and writes the write-targeted user data to the allocated actual page. The virtual page is a virtual storage area, and the actual page is a substantive storage area.

There are cases in which an actual page is allocated to a virtual page for user data that is not needed by the host apparatus, and, in addition, cases in which this unnecessary user data is written to this actual page.

One example of such a case is a copy of user data from a copy-source storage area to the virtual volume. The copy-source storage area, for example, is another logical volume (a logical volume either inside or outside of the OP storage comprising the virtual volume) or a magnetic tape. In accordance with this copy, data from the entire copy-source storage area is written to the virtual volume. For this reason, in a case where user data that is not needed by the host apparatus is included in this data, this unnecessary user data is also a write target with respect to the virtual volume. Therefore, an actual page is allocated to the virtual page, and the unnecessary user data is written to the actual page.

When an actual page is allocated to a virtual page for unnecessary user data, the actual page from the pool is used ineffectually.

In a case where a read request that specifies an address related to a virtual page to which an actual page has not been allocated is received from the host apparatus, the OP storage, for example, returns to this host apparatus data that has been configured such that all the bits are "0".

The OP storage disclosed in Patent Literature 1 makes a determination (hereinafter, the zero pattern determination) as to whether or not all the bits inside the actual page that is allocated to the virtual page are "0", and in a case where the result of the zero pattern determination is affirmative, cancels the allocation of this actual page to the virtual page.

Since the OP storage generally writes the user data from the start of the actual page, an actual page that is only storing unnecessary user data can be identified in accordance with the above-mentioned zero pattern determination.

CITATION LIST

Patent Literature

[PTL 1]
Japanese Patent Application Laid-Open No. 2008-146574

SUMMARY OF INVENTION

Technical Problem

The application of Thin Provisioning to a mainframe storage apparatus (hereinafter, MF storage) will be considered.

The problem of an actual page inside the pool being used ineffectually may also occur in a case where Thin Provisioning is applied to a MF storage.

However, it is not possible to solve this problem in the same way as for the OP storage. This is because all actual pages inside the MF storage comprise a bit that is not a "0". Specifically, in accordance with the concept of the mainframe track format, data other than user data is written to a track, and this data comprises a bit that is not a "0".

The MF storage may identify where inside the actual page the user data exists, and make the above-mentioned zero pattern determination with respect to this user data. However, this places a large load on the MF storage, and is not realistic.

Accordingly, an object of the present invention is to make it so that an actual page inside a MF storage that utilizes Thin Provisioning is not used ineffectually.

Solution to Problem

Each actual page inside the pool is configured from a plurality of actual tracks, and each virtual page inside the virtual volume is configured from a plurality of virtual tracks. A storage control apparatus of a mainframe system has management information that includes information denoting a track in which there exists a user record, which is a record including user data (the data used by a host apparatus of a mainframe system). Based on the management information, a controller identifies an actual page that is configured only from tracks that do not comprise a user record, and cancels the allocation of the identified actual page to the virtual page.

The storage control apparatus may be the controller of the MF storage, or may be a device (for example, a server device or an intelligent switching device) that relays communications between the MF storage and the host apparatus.

Advantageous Effects of Invention

It is possible to prevent an actual page inside a MF storage that utilizes Thin Provisioning from being used ineffectually.

DESCRIPTION OF EMBODIMENTS

Figure 1:
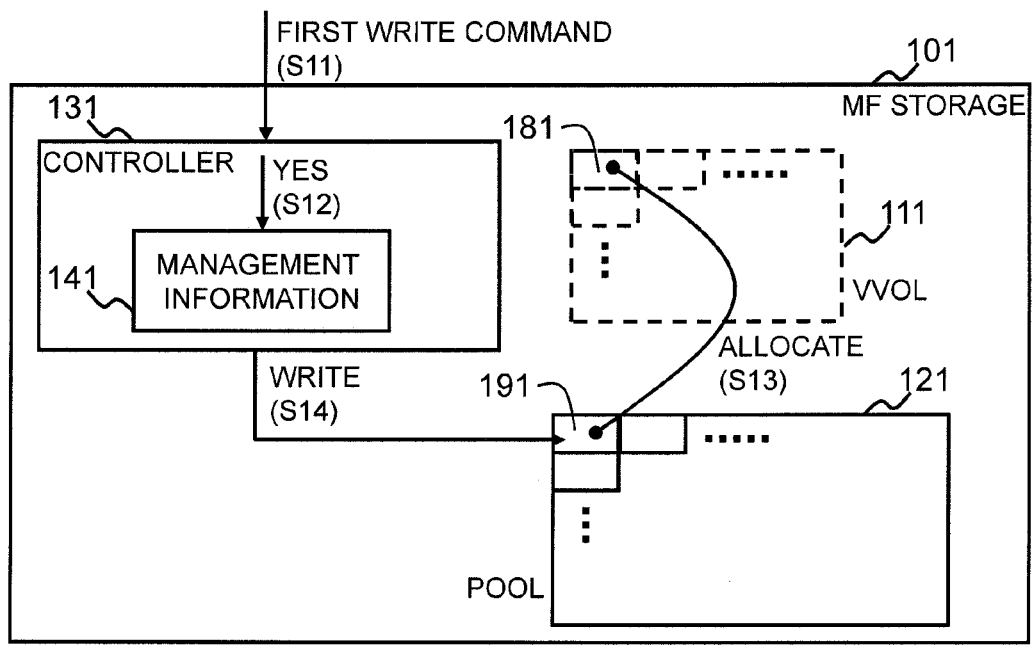
FIG. 1 shows an overview of a first process carried out by an Example 1 of the present invention.

An example of the present invention will be explained below by referring to the drawings.

Overview of Example

Figure 2:
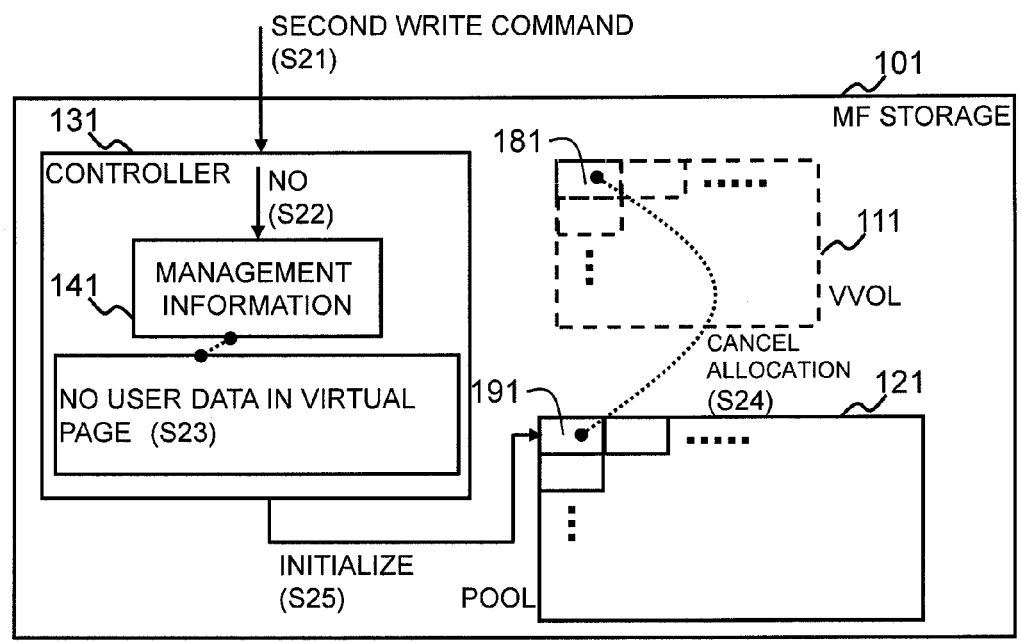
FIG. 2 shows an overview of a second process carried out by this example.

FIG. 1 shows an overview of a first process that is carried out in an example of the present invention, and FIG. 2 shows an overview of a second process that is carried out in this example.

A MF storage (a mainframe storage) 101 comprises a virtual volume (hereinafter, VVOL) 111, a pool 121, and a controller 131.

The VVOL 111 is a virtual logical volume that conforms to Thin Provisioning, and is configured from a plurality of virtual pages (virtual storage areas) 181.

The pool 121 is an actual page group that is configured from a plurality of actual pages (substantive storage areas) 191.

The controller 131 comprises management information 141. The management information 141 is information for managing data.

Figure 3:
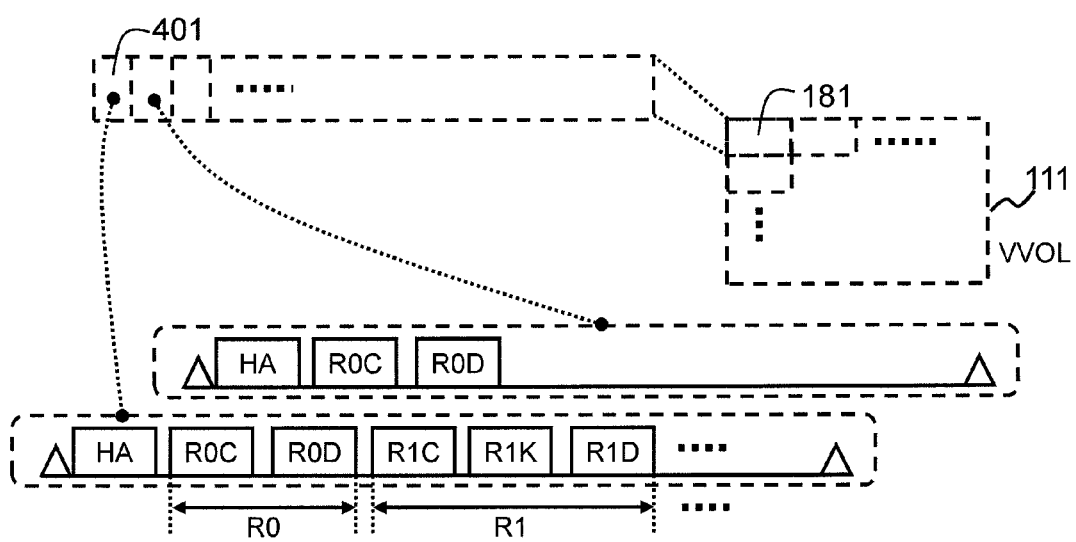
FIG. 3 shows a track format inside a virtual page 181.
Figure 4:
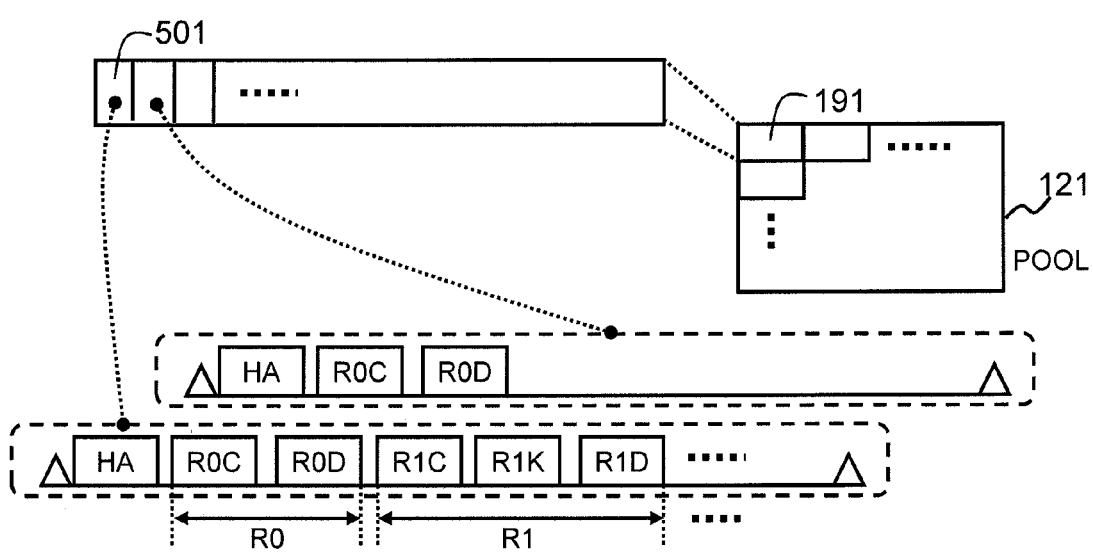
FIG. 4 shows the track format inside an actual page 191.

In accordance with the VVOL 111, which adopts a mainframe track format, a virtual page 181 is configured from a plurality (for example, 672) virtual tracks 401 as shown in FIG. 3, and therefore an actual page 191 is also configured from a plurality (for example, 672) of actual tracks 501 as shown in FIG. 4. In a case where the actual page 191 is allocated to the virtual page 181, the actual tracks 501 in the allocated actual page 191, for example, will correspond on a one-to-one basis with the virtual tracks 401 of this virtual page 181.

A track 401 (501) comprises one or more records. Hereinbelow, the record of the record number n (the $(n+1)^{th}$ record) may be called "Rn" (where n is an integer equal to or greater than 0). The record comprises three types of information, specifically, a count part (C), a key part (K) and a data part (D). Depending on the type of track format, there may be records of the type that do not comprise the key part.

The track 401 (501) comprises from the beginning (even when user data has not been written) a HA and a R0. The HA is located at the start of the track 401 (501), and is information (the home address part) related to the status of this track 401 (501). The R0 comprises a R0C and a R0D. The R0C is located subsequent to the HA, and is the count part for denoting the status, location and length of the R0. The R0D is located subsequent to the R0C, and is data with respect to a prescribed length (for example, 8 bytes). The HA, R0C and R0D are information of the initial track.

The user data is written to records R1 or later (to include R1). That is, the track 401 (501) that comprises the user data comprises one or more records (R1 and later records) other than the R0. Rm, which is the respective R1 and later records (where m is a natural number), comprise RmC, RmK and RmD. RmC is the count part denoting the Rm status, location and length. The RmK is information (the key part) that is a guide for the RmD that follows, and is used to search for the RmD (the record may also lack the key part). The RmD is the data part, and, for example, is the user data. The user data may comprise one Rm, or may distributively comprise a sequence of a plurality of Rm.

In this way, the mainframe track format is a CKD format (a variable length format) (where "CKD" is an abbreviation for Count Key Data). That is, meaningful information (HA, RnC, and so forth) other than the user data written in from the mainframe host apparatus (hereinafter, MF host) is written to each track 401 (501), and, in addition, the user data is written to R1 and later records.

Since the virtual track 401 is an element inside the virtual page 181, user data written to the virtual track 401 is actually written to the actual track 501 inside the actual page 191 allocated to this virtual page 181.

Further, the HA and R0 inside all the virtual tracks 401 are consolidated in information called HA/R0 consolidation information. The HA/R0 consolidation information is one type of information included in the management information 141. The HA/R0 consolidation information comprises RmC and data location information in addition to HA and R0 for each virtual track 401. The data location information is information that denotes the locations (locations in the track 401) of RmK and RmD.

In addition to the HA/R0 consolidation information, the management information 141 also includes track management information that shows which track 401 comprises the Rm (the record including the user data). A virtual page 181 that does not comprise user data is determined based on the track management information and the fact that each virtual page 181 is configured from 672 virtual tracks 401.

An overview of the processing carried out by this example will be explained below.

As shown in FIG. 1, in a case where the controller 131 receives a first write command from a mainframe host apparatus (hereinafter, MF host) (S11), the controller 131 processes this first write command. The first write command, for example, is a WRCKD command. The WRCKD command is the write command for one record, and is used for writing user data to any R1 and later records.

In the first process, the controller 131 updates the track management information inside the management information 141 to information signifying that an Rm is in the write-destination track 401 that conforms to the WRCKD command (S12). That is, the controller 131 updates the track management information to the information signifying that an Rm is in the write-destination track 401 prior to actually writing the user data.

The controller 131 allocates a free actual page 191 to the virtual page 181 comprising the write-destination track 401, and writes the write-targeted user data to the allocated actual page 191. The "free actual page 191" is an actual page 191, which has not been allocated to any virtual page 181, and which may be allocated to a virtual page 181.

In a case where the user data is written to the virtual page 181 in accordance with the WRCKD process like this, the fact that this virtual page 181 comprises the user data is written to the management information 141.

In a case where the controller 131 receives a second write command from the MF host as shown in FIG. 2 (S21), the controller 131 processes this command. The second write command is a write command that is not limited to writing to R1 and later records (user data), and, for example, is either a WRTRK command or an ERASE command. The WRTRK command is a one-track write command, and is used to write a RnD to a track. This command is also used for writing a R0D only. The ERASE command is used for deleting one or more R1 or later records.

In the second write command process, the controller 131 writes (or deletes) a record in accordance with the second write command.

The controller 131 carries out the following processes (x1) through (x4) in synchronization with the second write command process (following the processing of the second write command).

(x1) The controller 131 determines whether or not R1 and later records exist in the write-destination track (referred to as the "target track" in the explanation of FIG. 2) 401 that conforms to the command received in S21.

(x2) In a case where the result of the determination of (x1) is negative, the controller 131 updates the track management information inside the management information 141 to information signifying that there is no user data in the target track 401 (S22).

(x3) The controller 131, in a case where the target track 401 is the last track in the virtual page, makes a determination as to whether or not the post-update management information 141 shows that there is no user data in the virtual page (referred to as the "target virtual page" in the explanation of FIG. 2) 181 that comprises the target track 401.

(x4) In a case where the result of the determination made in (x3) is affirmative (S23), the controller 131 performs an unnecessary actual page cancellation process. As used here, an "unnecessary actual page" is the actual page 191 that is allocated to the target virtual page 181, that is, an actual page that does not store user data needed by the MF host. In cancelling an unnecessary actual page, the controller 131 cancels the allocation of the unnecessary actual page 191 to the target virtual page 181 (S24), and, in addition, initializes the unnecessary actual page 191 (S25). The initialization of the unnecessary actual page 191 involves deleting all the R1 and later records from all the tracks 501 inside the unnecessary actual page 191.

Carrying out the (x4) increases the free actual pages 191 in the pool 121.

According to the explanations of FIGS. 1 and 2, the unnecessary actual page cancellation may be carried out based on the management information 141. That is, it is possible to identify the unnecessary actual page 191 without reading data from the actual page 191.

In addition, according to the explanations of FIGS. 1 and 2, the unnecessary actual page cancellation is carried out in synchronization with the second write process (following the second write process). In accordance with an OP storage, a zero pattern determination is performed asynchronously to the writing of data from the host apparatus to the VVOL. Therefore, in accordance with an OP storage, an actual page in which only unnecessary user data is written is allocated one time to the VVOL and remains allocated to the VVOL for a time. By contrast, in accordance with this example, since the unnecessary actual page cancellation is carried out in synchronization with the second write process, when the actual page 191 becomes an unnecessary actual page 191, it is possible to remove this unnecessary actual page 191 from the VVOL 111 in accordance with the second write process.

Detailed Description of this Example

<<Mainframe Computer System Configuration>>

Figure 5:
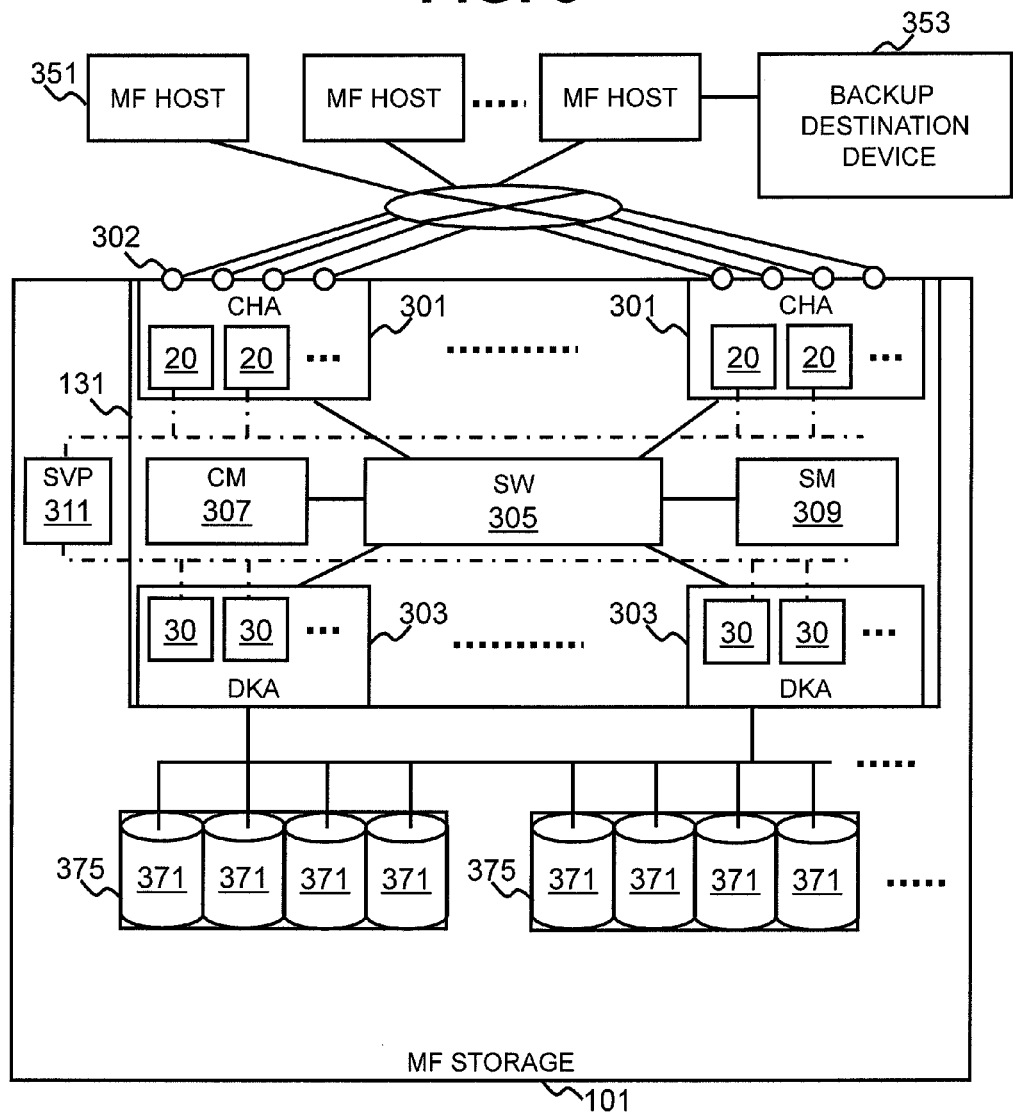
FIG. 5 shows the configuration of a mainframe computer system related to this example.

FIG. 5 shows the configuration of a mainframe computer system related to this example.

One or more MF hosts 351 and a MF storage 101 are coupled to a communication network 551.

The MF host 351 sends a data write command and read command to the logical volume that is provided from the MF storage 101. The input/output of data to/from the logical volume is carried out in response to this write command and read command.

There may be a MF host 351 that is coupled to a backup-destination device 353. This MF host 351 reads all the data from the logical volume that this MF host 351 utilizes, backs up this data in the backup-destination device 353, reads all the backup data of the logical volume from the backup-destination device 353 and restores this data in the VVOL 111. Data that the MF host 351 does not need may be included in all the backup data. The backup-destination device 353 may be a stand-alone physical storage device (for example, a HDD (Hard Disk Drive), a magnetic tape drive, or a MO (Magneto-Optical disk) drive), or may be a storage apparatus comprising a plurality of physical storage devices.

The MF storage 101 comprises a physical storage device group, a controller 131, and a SVP (Service Processor) 311.

The physical storage device group is a cluster of a plurality of physical storage devices 371 (for example, either HDD (Hard Disk Drives) or flash memory devices (for example, SSD (Solid State Drives))). The physical storage device group comprises one or more RAID (Redundant Array of Independent (or Inexpensive) Disks) groups 375. The RAID group 375 is configured from two or more physical storage devices 371, and stores data at a prescribed RAID level. A substantive logical volume (hereinafter, actual volume) is created based on the storage space of the one or more RAID groups 375. The pool 121, for example, is a cluster of one or more actual volumes, and each actual volume inside the pool 121 may be partitioned into two or more actual pages 191.

The controller 131 comprises a communication interface with the MF host 351, a communication interface with the physical storage device 371, a memory, and a processor that is coupled to these elements. Specifically, for example, the controller 131 comprises a CHA 301, a DKA 303, a cache memory (hereinafter, CM) 307, a shared memory (hereinafter, SM) 309, and a switching device (hereinafter, SW) 305. There is one or more of each of these elements.

The CHA 301 is an interface device for communicating with the MF host 351. The CHA 301 comprises a port 302, and a MP (microprocessor) 20. There is one or more of each of these elements. The MP 20 processes a command from the MF host 351. For example, the MP 20 writes write-targeted user data to the CM 307 in response to a write command received from the MF host 351 via the port 302.

The DKA 303 is an interface device for communicating with the physical storage device 371. The DKA 303 comprises one or more MP (microprocessors) 30. The MP 30 controls the input/output of data to/from the physical storage device 371. For example, the MP 30 writes write-targeted user data that is stored in the CM 307 to the RAID group 375 that is based on the write-destination actual page 191 of this user data.

The CM 307 is a memory that is shared by the plurality of MPs 20 and 30, and temporarily stores the user data input/output to/from the physical storage device group.

The SM 309 is a memory that is shared by the plurality of MPs 20 and 30, and stores either all or part of the management information 141. The CM 307 and the SM 309 may be a single memory rather than two separate memories. That is, one memory may comprise an area that is used as the CM and an area that is used as the SM.

The CHA 301, the DKA 303, the CM 307 and the SM 309 are coupled to the SW 305. The SW 305, for example, is a cross-bus switch, and switches the connections among these elements. The CHA 301, the DKA 303, the CM 307 and the SM 309 may be coupled to one another by a coupling unit (bus, for example) other than the SW 305.

The SVP 311 is a computer that is used to either maintain or manage the MF storage 101, and, for example, is coupled to the respective MPs 20 and 30 via a LAN (Local Area Network). For example, the SVP 311 displays information included in the management information 141. The SVP 311 may exist outside the MF storage 101.

<<Format Conversion from CKD Format to FBA Format>>

The mainframe track format is a CKD format (a variable length format). That is, records written from the MF host 351 are of variable length.

Alternatively, in the storage area inside the MF storage 101, for example, each block that configures the CM 307 is a fixed length.

Accordingly, when there is a data write from the MF host 351, a format conversion is necessary to convert the CKD format (the variable length format) to an FBA format (the fixed length format) ("FBA" is the abbreviation for Fixed Block Architecture).

Figure 6:
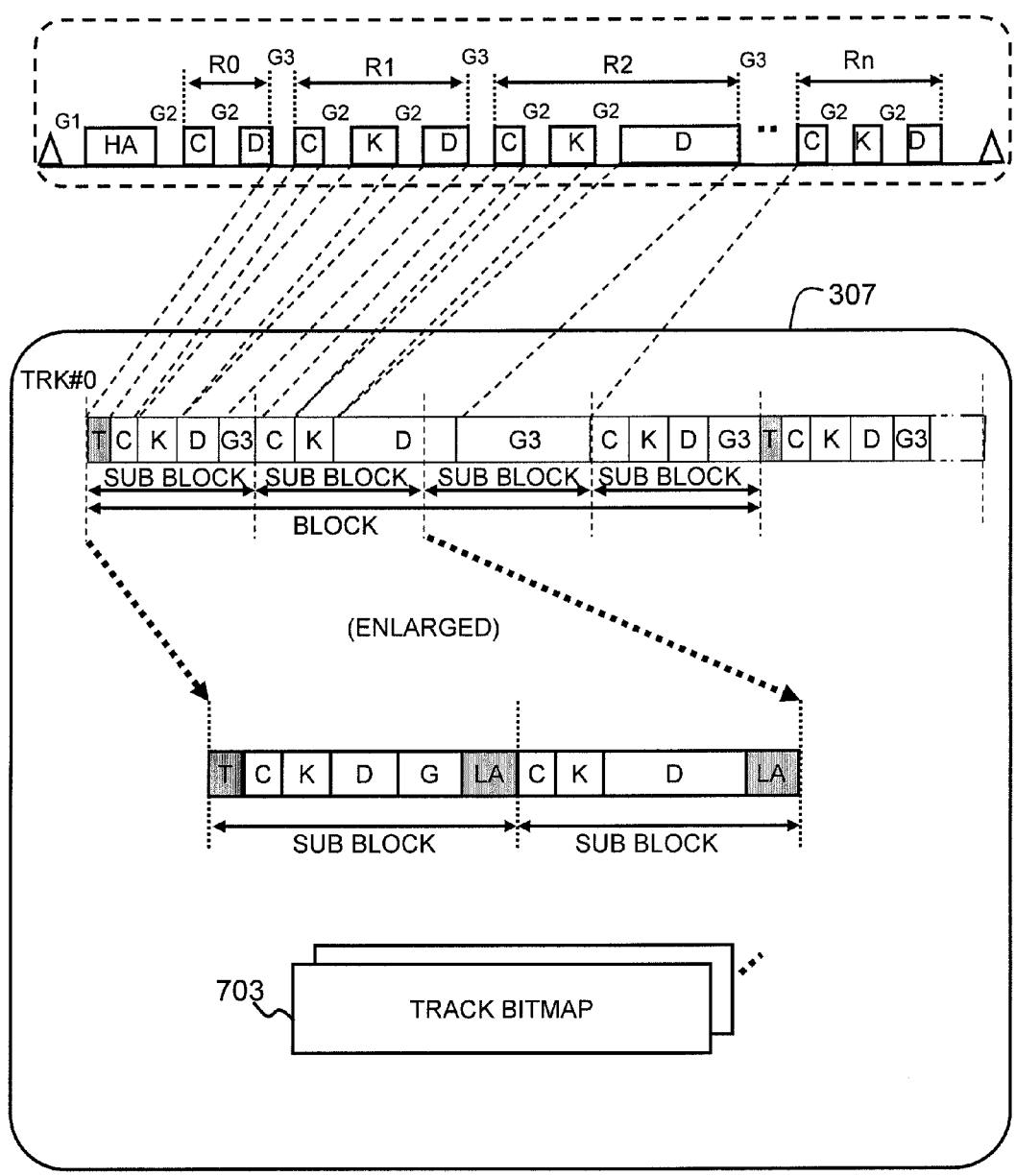
FIG. 6 is a diagram showing a format conversion from a CKD format to a FBA format.

This format conversion may be performed by the MP 20 (or 30), but in this example, this conversion is carried out using hardware called a format conversion circuit 651 as shown in FIG. 6. The circuit 651, for example, is in the CHA 301.

The CM 307 is configured from a plurality of slots. Each slot is configured from a plurality of blocks. Each block is configured from a plurality of sub-blocks. The length of one track in this example is the same length as the total of the lengths of a plurality blocks.

The format conversion circuit 651 converts the format as shown in the example of FIG. 6. That is, the circuit 651 excludes the gaps (G2) (the gaps inside the records) that exist in each Rn, and writes each Rn, exclusive of the gaps (G2), to the CM 307. Furthermore, a gap (G1) is the gap between the start of the track and the HA, and a gap (G3) is the gap between the records.

The data (the data inside the block), which is written to the CM 307 like this, is written to the actual page 191. Therefore, the R1 and later records inside the actual page 191 are records without gaps (G2).

Label information (LA) is written at the end of the sub-block.

Track information (T) is written at the start of the first sub-block of the block. The track information (T) is for emulating the data written from the MF host 351 to the MF storage 101 in the CKD variable length record. The track information (T), for example, comprises information (for example, a bit) denoting the presence or absence of a Rm. For example, in a case where a certain block comprises a R3 and a R4 inside a certain track, the track information (T) of the start of this block will comprise information denoting that R3 and R4 are present.

<<Track Bitmap>>

Figure 7:
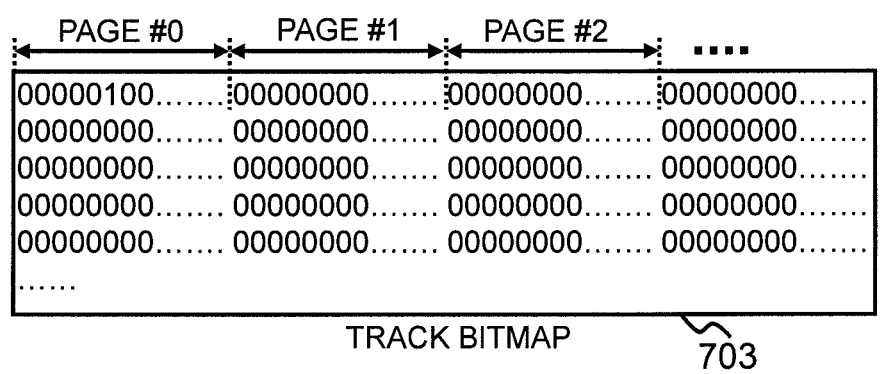
FIG. 7 shows the configuration a track bitmap 703.

The CM 307 comprises a track bitmap 703. A track bitmap 703 exists in each VVOL 111. The track bitmap 703, as shown in FIG. 7, is configured from a plurality of bits that correspond to the plurality of tracks 401 of the VVOL 111. Therefore, the respective bit groups (sequence of a prescribed number of bits) correspond to the respective virtual pages 181. An ON bit (for example, bit "1") signifies that the track 401 corresponding to this bit comprises R1 and later records. An OFF bit (for example, bit "0") signifies that the track 401 corresponding to this bit does not comprises R1 and later records. Therefore, in a case where there is even one ON bit in the bit group corresponding to the virtual page 181, user data exists in this virtual page 181 (in the actual page 191 allocated to this virtual page 181), and in a case where there is no ON bit in the bit group corresponding to the virtual page 181, user data does not exist in this virtual page 181 (in the actual page 191 allocated to this virtual page 181).

It is possible to determine whether or not there is user data in the track 401 (501) based on the track information (T), but making this determination by acquiring the track information (T) of the first sub-block in each track takes a great deal of time. For this reason, as described hereinabove, it is possible to quickly determine whether or not user data exists in the track 401 (501) in a case where there is a track bitmap 703 in which information denoting the presence or absence of R1 and later records is consolidated.

<<Management Information>>

Figure 8:
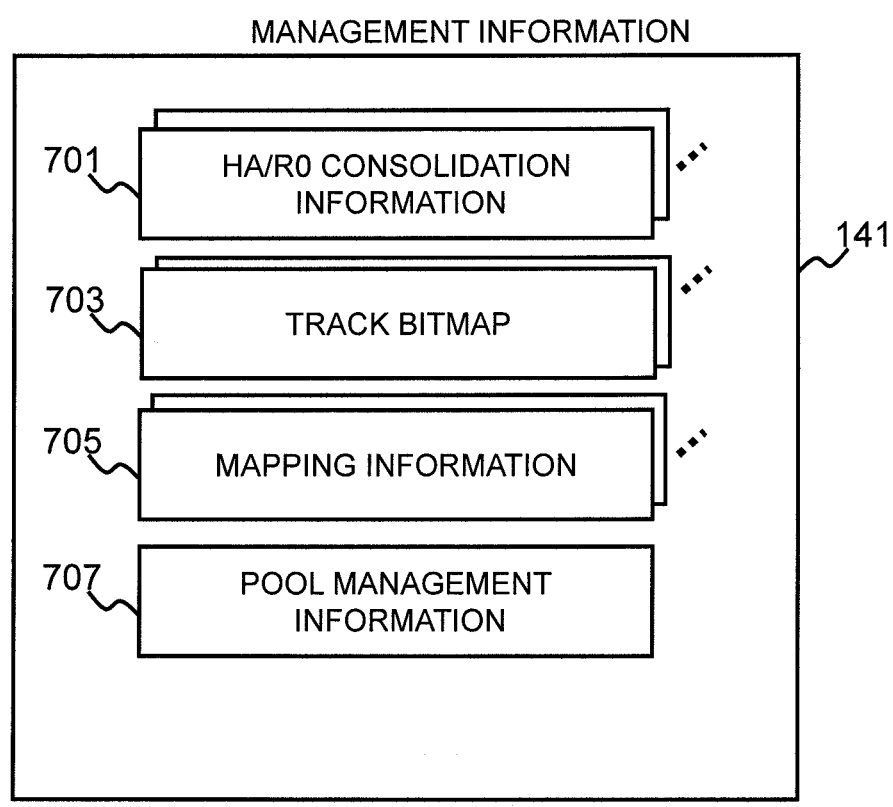
FIG. 8 shows various information of management information 141.

FIG. 8 shows the various types of information of the management information 141.

The management information 141 comprises HA/R0 consolidation information 701, the track bitmap 703, mapping information 705, and pool management information 707. The information 701, 703, and 705, for instance, exists in each VVOL 111. The information 701, 703, 705, and 707 may exist anywhere in the SM 309, the CM 307 and the physical storage device group.

The mapping information 705 denotes whether or not an actual page 191 has been allocated to each virtual page 181. In a case where an actual page 191 is allocated to a virtual page 181, the mapping information 705 may comprise identification information (for example, a combination of the pool 121 number and the actual page 191 number) of the actual page 191 that is allocated to this virtual page 181.

The pool management information 707 denotes whether each actual page 191 is free or allocated.

<<Explanation of Processing>>

Figure 9:
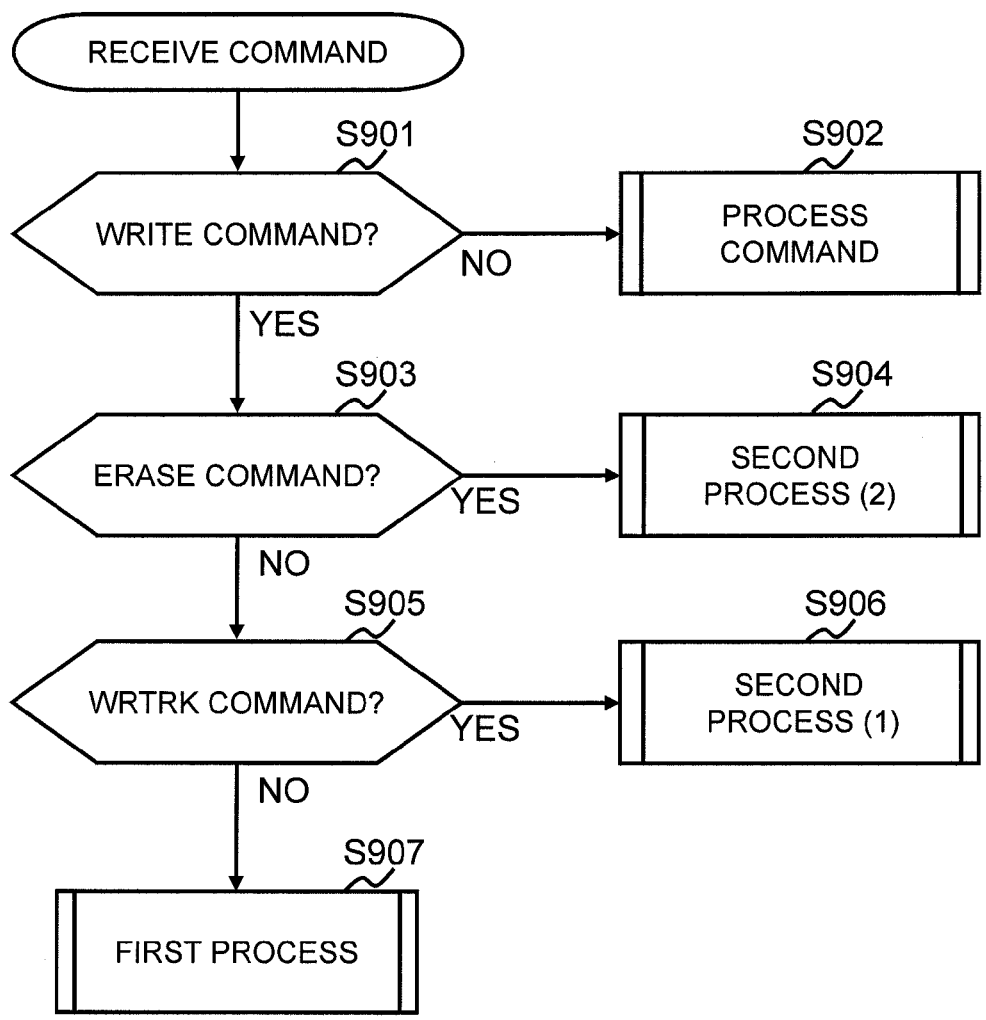
FIG. 9 shows the flow of processing carried out in a case where a CHA 301 receives a command from a MF host 351.

FIG. 9 shows the flow of processing carried out in a case where the CHA 301 receives a command from the MF host 351. The following process, for example, is performed by the MP 20, which is inside the CHA 301 that received the command, executing a computer program.

The MP 20 determines whether or not the received command is a write command (S901).

In a case where the result of the determination in S901 is negative (S901: NO), the MP 20 processes the received command (S902). For example, in a case where the received command is a read command with respect to the VVOL 111, the MP 20 identifies the virtual page 181 that comprises the record identified from this read command, and identifies the actual page 191 that is allocated to this virtual page 181 on the basis of the mapping information 705. In accordance with this, the MP 30 inside the DKA 303 writes the user data of the record inside the identified actual page 191 to the CM 307, and the MP 20 sends the user data that has been written to the CM 307 to the MF host 351.

In a case where the result of the determination in S901 is affirmative (S901: YES), the received command is a write command. In this example, there are three types of write commands, an ERASE command, a WRTRK command, and a WRCKD command.

The ERASE command is for deleting either all the R1 and later records, or all the records from a user-desired record and later that come after the R1.

The WRTRK command is the write command for writing records to an entire track. The WRTRK command is also used when writing only a R0.

The WRCKD command is the write command for writing a single record, and is not able to be used to write a R0. For this reason, the WRCKD command is always for writing any R1 and later record.

In a case where the received command is the WRCKD command (S903: NO and S905: NO), the first process, which was explained by referring to FIG. 1, is carried out (S907).

In a case where the received command is the WRTRK command (S903: NO and S905: YES), one type of second process (second process (1)), which was explained by referring to FIG. 2, is carried out (S906).

In a case where the received command is the ERASE command (S903: YES), another type of second process (second process (2)), which was explained by referring to FIG. 2, is carried out (S904).

Figure 10:
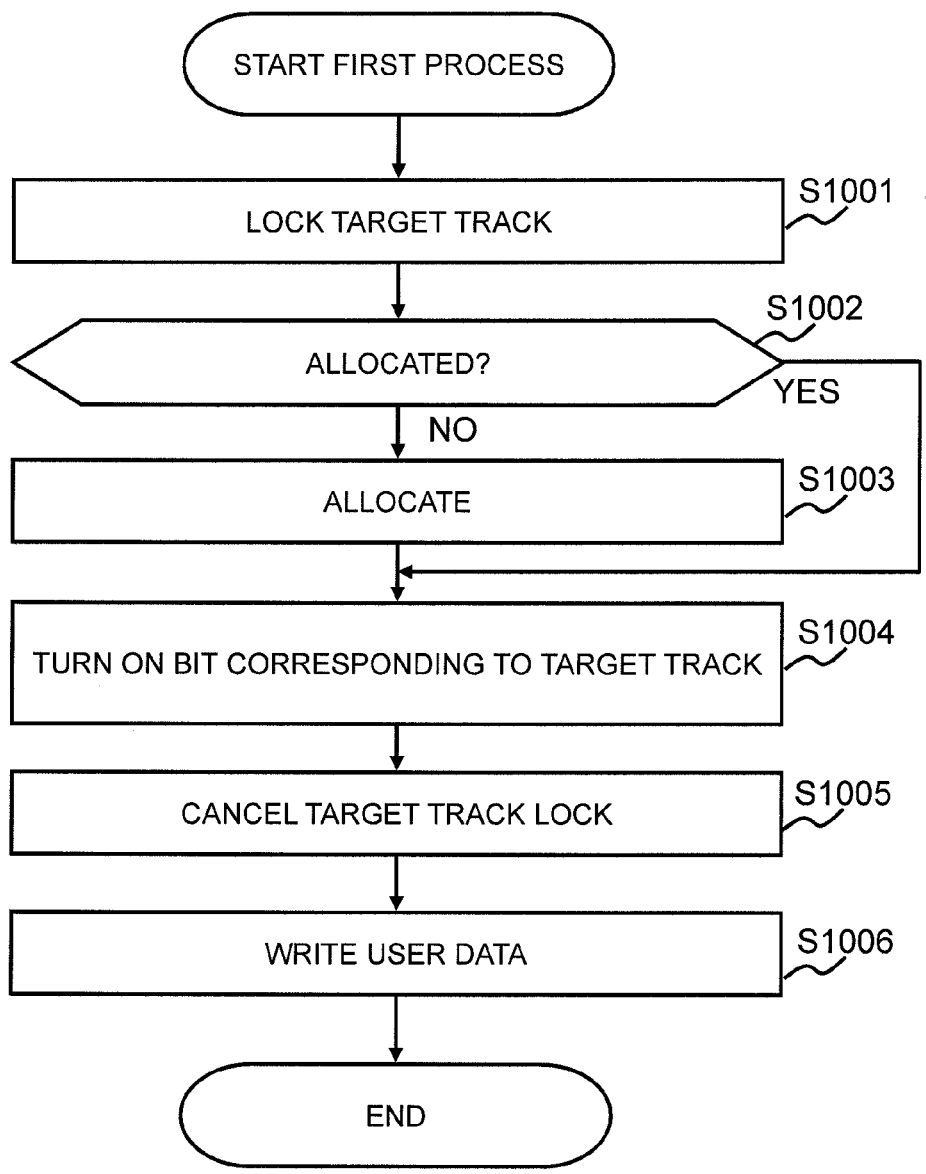
FIG. 10 shows the processing flow of a first process.

FIG. 10 shows the flow of processing of the first process. This process, for example, may be carried out by the MP 20 executing a computer program for processing the WRCKD command.

First, the MP 20 locks the target track (S1001). As used here, the "target track" is the track that is identified based on write-destination information in the WRCKD command. The reason for locking the target track is to prevent the target track from being accessed by another MP.

Next, the MP 20, based on the mapping information 705, determines whether or not an actual page 191 has been allocated to the virtual page (hereinafter, the "target virtual page" in the explanation of FIG. 10) 181 comprising the target track (S1002).

In a case where the result of the determination of S1002 is negative (S1002: NO), the MP 20 allocates any free actual page 191 to the target virtual page 181 (S1003). Specifically, for example, the following processing is carried out.
(*) The MP 20 finds a free actual page 191 based on the pool management information 707.
(*) The MP 20 updates the mapping information 705 to information denoting that the free actual page 191 that was found has been allocated to the target virtual page 181.
(*) The MP 20 updates the pool management information 707 to information denoting that the free actual page 191 that was found has been allocated.

Next, the MP 20 turns ON the bit corresponding to the target track in the track bitmap 703 (S1004).

Next, the MP 20 cancels the target track lock (S1005).

Lastly, the MP 20 writes the user data (R1 and later) to the track corresponding to the target track in the actual page that has been allocated to the target virtual page 181 (S1006). The records comprising the user data are written in order from the start of the track to the end of the track. Additionally, the records are written in order from the first track 401 (501) to the last track 401 (501) of the virtual page 181 (the actual page 191).

According to the first process, the bit (the bit in the track bitmap 703) that corresponds to the target track is turned ON prior to writing the user data to the actual page 191. For example, in a case where the bit corresponding to the target track is turned ON subsequent to writing the user data to the actual page 191, the following problem occurs. That is, in a case where an error of some sort occurs after the user data has been written to the actual page 191 but prior to the bit being turned ON, thereby preventing the bit that should be turned ON from being turned ON, there is the likelihood that the allocation of the actual page 191 in which the user data is being stored will be cancelled in the second process either (1) or (2), which will be described hereinbelow. In this example, it is possible to avoid this problem.

Figure 11:
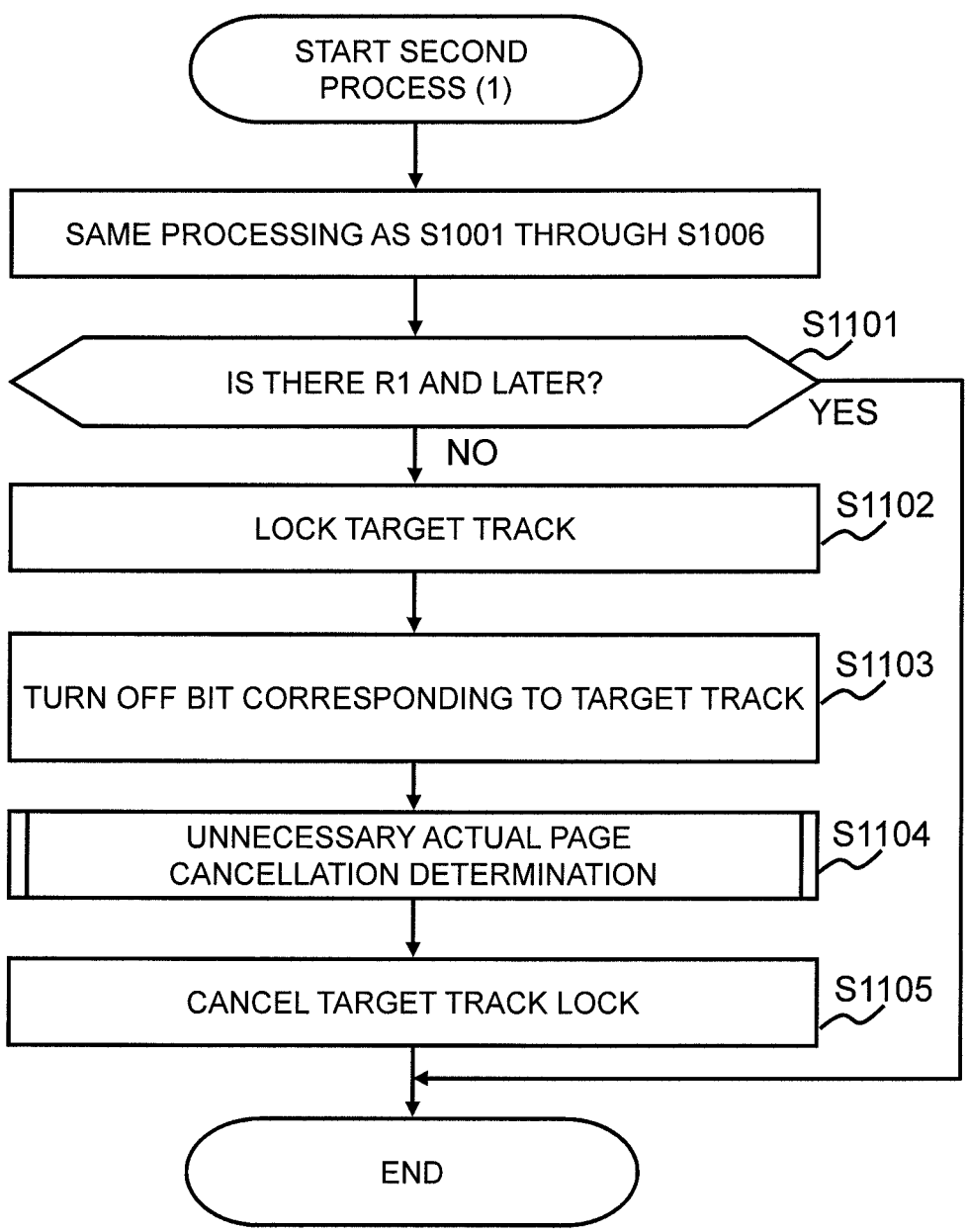
FIG. 11 shows the processing flow of a second process (1).

FIG. 11 shows the flow of processing of the second process (1). This process, for example, may be carried out by the MP 20 executing a computer program for processing the WRTRK command.

The same processing as S1001 through S1006 (refer to FIG. 10) is performed. However, in S1006, instead of one R1 or later record, either a plurality of records are written to the entire target track, or only the R0 is written to the target track.

The "target track" referred to in FIG. 11 (and FIG. 13) is the track that was identified based on the write-destination information of the WRTRK command.

Next, the MP 20 determines whether or not R1 and later records are in the target track (S1101). This determination may be made based on the track information (T) that is in the first sub-block of the target track.

In a case where the result of the determination of S1101 is negative (S1101: NO), there is the likelihood that the actual page 191 allocated to the virtual page (hereinafter, the "target virtual page" in the explanation of FIGS. 11 and 13) 181 that comprises the target track does not comprise user data. Accordingly, the following S1102 through S1105 are carried out.

That is, the MP 20 locks the target track (S1102).

Next, the MP 20 turns OFF the bit corresponding to the target track (the bit in the track bitmap 703) (S1103).

Next, the MP 20 performs an unnecessary actual page cancellation determination (S1104). In a case where the fact that no user data is in the target virtual page 181 is detected in this process, the allocation of the actual page 191 to the target virtual page 181 is cancelled, and, in addition, the actual page 191 is initialized.

Lastly, the MP 20 cancels the target track lock (S1105).

In a case where the result of the determination of S1101 is affirmative (S1101: YES), the actual page 191 allocated to the target virtual page 181 comprises user data. For this reason, the above-mentioned S1102 through S1105 are skipped.

Figure 12:
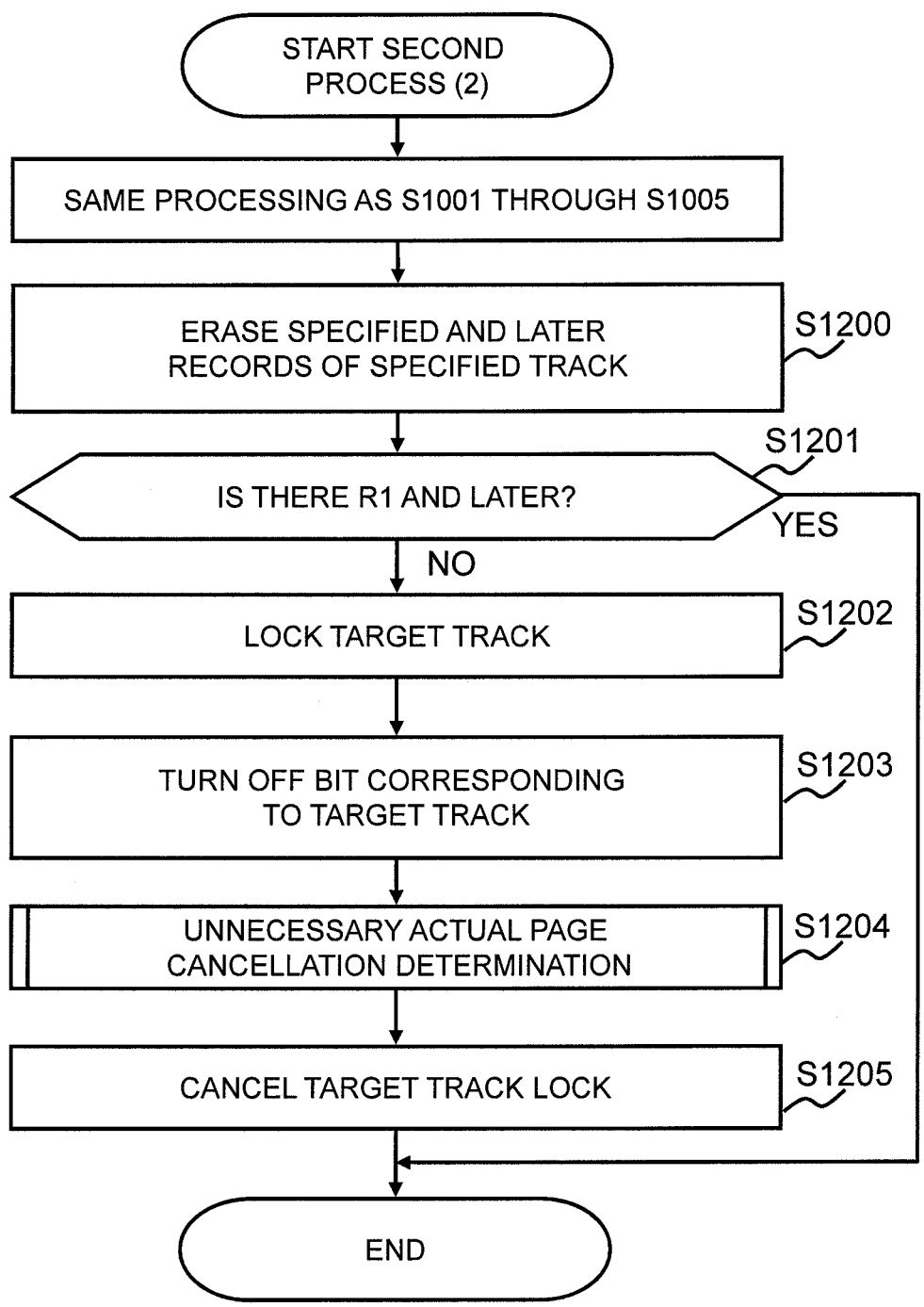
FIG. 12 shows the processing flow of a second process (2).

FIG. 12 shows the flow of processing of the second process (2). This process, for example, may be carried out by the MP 20 executing a computer program for processing the ERASE command.

The same processing as S1001 through S1005 (Refer to FIG. 10) is performed. Furthermore, this processing does not always have to be carried out.

The MP 20 deletes one or more target records from the target track (S1200). The "target track" referred to in FIG. 12 (and FIG. 13) is the track identified based on the ERASE command. The "one or more target records" are one or more records identified based on the ERASE command, and, for example, are either all the R1 and later records, or all the records from a user-desired record or later that come after the R1.

In S1200, the MP 20 updates the HA/R0 consolidation information 701 without deleting the target record from the actual page that is allocated to the virtual page (hereinafter, the "target virtual page" in the explanation of FIGS. 12 and 13) 181 comprising the target track (for example, deletes the information corresponding to the target record from the HA/R0 consolidation information 701). That is, the MP 20 deletes the virtually targeted record without deleting the physically targeted record.

Accordingly, the following processing is carried out in synchronization with the ERASE command processing (following the ERASE command processing).

That is, the MP 20 determines whether or not R1 and later records are in the target track (S1201). This determination may be made based on the track information (T) that is in the first sub-block of the target track.

In a case where the result of the determination of S1201 is negative (S1101: NO), there is the likelihood that the actual page 191 allocated to the virtual page (hereinafter, the "target virtual page" in the explanation of FIGS. 12 and 13) 181 that comprises the target track does not comprise user data. Accordingly, the following S1202 through S1205 are carried out.

That is, the MP 20 locks the target track (S1202).

Next, the MP 20 turns OFF the bit corresponding to the target track (the bit in the track bitmap 703) (S1203).

Next, the MP 20 performs an unnecessary actual page cancellation determination (S1204). In a case where the fact is detected that no user data is in the target virtual page 181, the allocation of the actual page 191 to the target virtual page 181 is cancelled, and, in addition, the actual page 191 is initialized.

Lastly, the MP 20 cancels the target track lock (S1205).

In a case where the result of the determination of S1201 is affirmative (S1201: YES), the actual page 191 allocated to the target virtual page 181 comprises user data. For this reason, the above-mentioned S1202 through S1205 are skipped.

Figure 13:
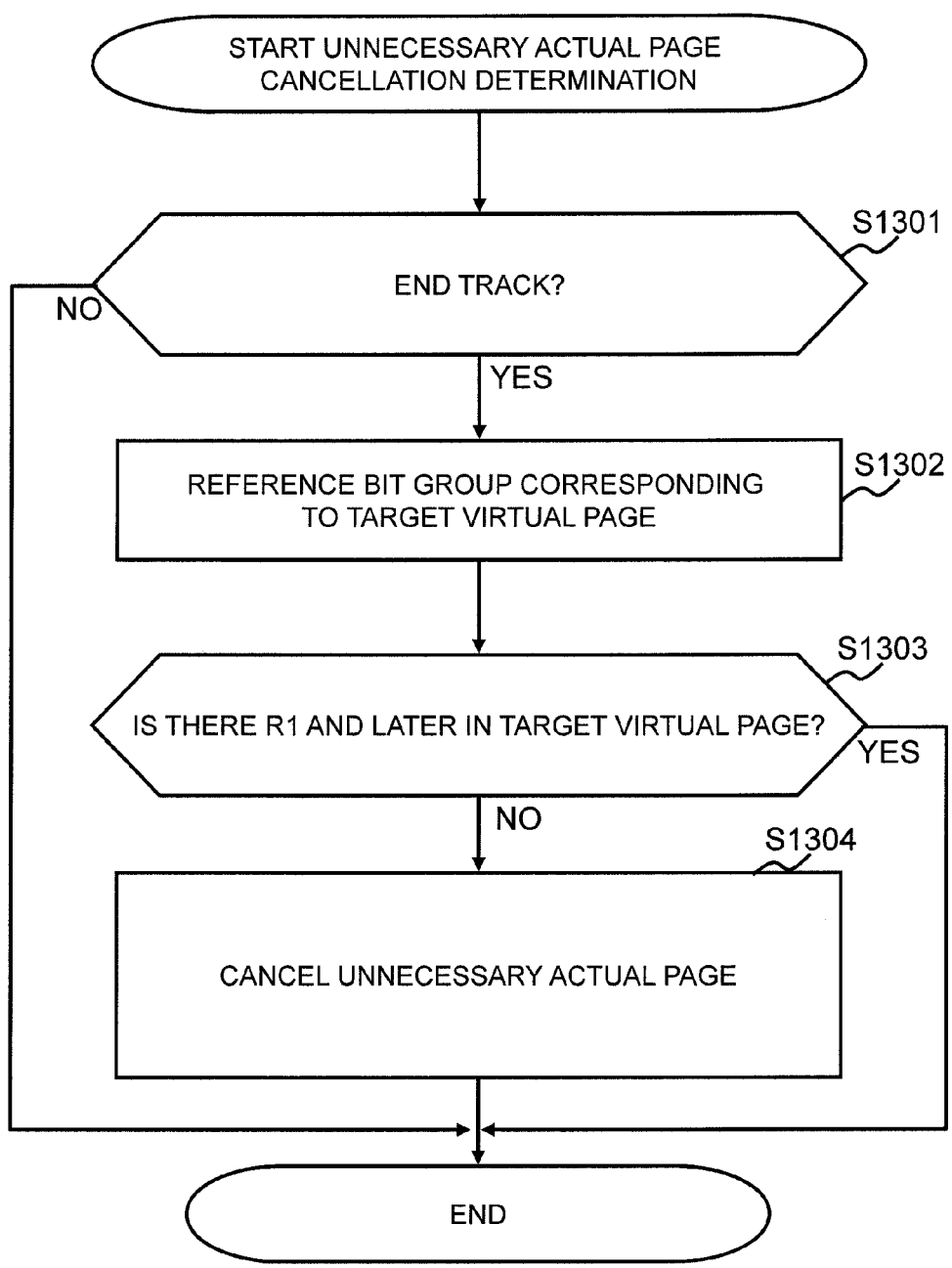
FIG. 13 shows the processing flow of an unnecessary actual page cancellation determination.

FIG. 13 shows the flow of processing of the unnecessary actual page cancellation determination. This process, for example, may be carried out by the MP 20 executing a computer program for determining an unnecessary actual page cancellation. This process is called in either the second process (1) or (2). Either instead of or in addition to this, this determination process may be called from the SVP 311 in response to a clear instruction from the system administrator.

The records are written to the virtual page 181 (actual page 191) in order from the first track 401 (501) to the last track 401 (501).

Accordingly, the MP 20 determines whether or not the target track is the last track of the target virtual page 181 (S1301).

In a case where the result of the determination of S1301 is affirmative (S1301: YES), there is the likelihood that user data does not exist in the target virtual page 181. The MP 20 references the bit group corresponding to the target virtual page (the bit group in the track bitmap 703) (S1302).

Next, the MP 20 determines whether or not there is an ON bit in the referenced bit group (S1303).

In a case where the result of the determination of S1303 is negative (S1303: NO), there is no user data in the target virtual page 181. Therefore, the actual page 191 allocated to the target virtual page 181 is an unnecessary actual page 191. For this reason, the MP 20 cancels the unnecessary actual page (S1304). Specifically, the following is performed.

(*) The MP 20 cancels the allocation of the actual page 191 to the target virtual page 181. More specifically, the MP 20 updates the mapping information 705 to information denoting that the actual page 191 is not allocated to the target virtual page 181.

(*) The MP 20 initializes the allocation-cancelled actual page 191. As a result of this, all R1 and later records are deleted from this actual page 191, and consequently this actual page 191 comprises only HA and R0.

(*) The MP 20 updates the pool management information 707 to information denoting that the initialized actual page 191 is free.

Cancelling the unnecessary actual page increases the free actual pages 191 in the pool 121.

In a case where the result of the determination of S1303 is affirmative (S1303: YES), user data exists in the target virtual page 181. For this reason, S1304 is skipped.

In a case where the result of the determination of S1301 is also negative (S1301: NO), there is user data in the target virtual page 181. For this reason, S1302 and subsequent steps are skipped.

According to the explanation of FIG. 13, each time either a WRTRK command or an ERASE command is received, S1302 and later steps are only carried out in a case where the target track is the last track in the target virtual page 181. In accordance with this, S1302 and later steps are not carried out needlessly.

The preceding has been an explanation of this example. According to this example, the ineffectual use of an actual page 191 in the MF storage 101 can be avoided in synchronization with the processing of a second write command (for example, either a WRTRK command or an ERASE command) from the MF host 351.

An example of the present invention has been explained hereinabove, but the present invention is not limited to this example, and it goes without saying that various changes are possible without departing from the gist thereof.

REFERENCE SIGNS LIST

101 Mainframe storage

The invention claimed is:

1. A storage apparatus of a mainframe system, comprising:
a physical storage device group; and
a controller coupled to a host apparatus of a mainframe system and the physical storage device group,
wherein there is a pool which is based on the physical storage device group, the pool is configured from a plurality of actual pages, and each actual page is configured from a plurality of actual tracks, each of the plurality of actual tracks including a first track, the first track not including user data,
wherein there is a virtual volume which is a virtual logical volume to which thin provisioning is applied, the virtual volume is configured from a plurality of virtual pages, and each virtual page is configured from a plurality of virtual tracks corresponding to actual tracks of the plurality of actual tracks,
wherein the controller allocates respective actual pages of the plurality of actual pages to respective virtual pages of the plurality of virtual pages, and
wherein the controller has track management information denoting a virtual track in which there exists at least one user record, each at least one user record including user data used by the host apparatus,
wherein when the controller receives a first write command, which is a write command to write one of the user records to a target track, the controller performs a first process in response to the first write command, the first process comprising:
(a1) when an actual page has not been allocated to a virtual page that comprises a target track, which is a virtual track that conforms to the received first write command, the controller allocates any free actual page inside the pool to the virtual page, and
(a2) the controller updates the track management information to information denoting that the user record is written to the target track, and writes the user data to an actual track corresponding to the target track, and
wherein when the controller receives a second write command after receiving the first write command, the controller performs a second process in response to the second write command, which is either a write command to write records to an entire target track or an erase command to delete at least one user record, the second process comprising:
(b1) the controller processes the received second write command,
(b2) in synchronization with processing the received second write command, the controller determines whether the user record exists in a target track, which is a virtual track that conforms to the received second write command, and when the result of the determination of (b2) is negative, (b3) and (b4) are executed as follows:

(b3) the controller updates the track management information to information denoting that the user record is not written to the target track, and (b4) the controller determines whether the user record exists in the actual page allocated to the virtual page comprising the target track, based on the track management information updated in (b3), and when the result of the determination of (b4) is negative, the actual page allocated to the virtual page comprising the target track is configured only from tracks that do not comprise the user record, and the controller cancels the allocation of the actual page to the virtual page, wherein when the result of the determination of (b2) is affirmative, the controller does not execute (b3) and (b4).

2. A storage apparatus according to claim 1,
wherein, subsequent to (b3), the controller determines whether the target track is the last track in the virtual page comprising the target track, executes (b4) when the result of the determination is affirmative, and does not execute (b4) when the result of the determination is negative.

3. A storage apparatus according to claim 1,
wherein, in (a2), the controller updates the track management information to information denoting that the user record is written to the target track, and thereafter, writes the user data to an actual track corresponding to the target track.

4. A storage apparatus according to claim 1,
wherein the user record comprises a count part, which is information denoting a status, a location and a length of the user record, and a data part, which is either all or a portion of the user data,
wherein the controller has a cache memory area, which temporarily stores a user record written to the actual page,
wherein the cache memory area is configured from a plurality of blocks,
wherein one virtual track corresponds to two or more blocks of the plurality of blocks,
wherein each block stores track information,
wherein the track information is information denoting whether the user record exists in an actual track inside an actual page that has been allocated to a virtual page that comprises a virtual track corresponding to a block that stores the track information, and
wherein the track management information is information prepared separately from the track information.

5. A storage apparatus according to claim 4, wherein the track management information is bitmap information configured from a plurality of bits corresponding to a plurality of virtual tracks of the virtual volume.

6. A storage apparatus according to claim 1,
wherein the first write command is a count key data write command (WRCKD command), and the second write command is either a one-track write command (WRTRK command) or an ERASE command.

7. A storage apparatus according to claim 1,
wherein the user record comprises a count part, which is information denoting a status, a location and a length of the user record, and a data part, which is either all or a portion of the user data,
wherein the controller has a cache memory area, which temporarily stores a user record written to the actual page,
wherein the cache memory area is configured from a plurality of blocks,
wherein one virtual track corresponds to two or more blocks of the plurality of blocks,
wherein each block stores track information,
wherein the track information is information denoting whether the user record exists in an actual track inside an actual page that has been allocated to a virtual page that comprises a virtual track corresponding to a block that stores the track information, and
wherein the track management information is information prepared separately from the track information.

8. A storage apparatus according to claim 7,
wherein the track management information is bitmap information configured from a plurality of bits corresponding to a plurality of virtual tracks of the virtual volume.

9. A storage apparatus according to claim 1, wherein the controller initializes the identified actual page.

10. A storage control method realized in a storage apparatus of a mainframe system, comprising the steps of:
allocating an actual page to a virtual page of a plurality of virtual pages that configure a virtual volume; and
wherein a pool is configured from a plurality of actual pages, and each actual page is configured from the plurality of actual tracks, each of the plurality of actual tracks including a first track, the first track not including user data,
wherein the virtual volume is a virtual logical volume to which thin provisioning is applied, is configured from a plurality of virtual pages, and each virtual page is configured from a plurality of virtual tracks corresponding to actual tracks of the plurality of actual tracks, and
wherein the track management information is information denoting a virtual track in which there exists a user record, which is a record including user data used by a host apparatus;
receiving, by a controller, a write command;
when the controller receives a first write command, which is a write command to write one of the user records to a target track, performing, by the controller, a first process in response to the first write command, the first process comprising:

(a1) when an actual page has not been allocated to a virtual page that comprises a target track, which is a virtual track that conforms to the received first write command, allocating, by the controller, any free actual page inside the pool to the virtual page, and (a2) updating, by the controller, the track management information to information denoting that the user record is written to the target track, and writing, by the controller, the user data to an actual track corresponding to the target track; and when the controller receives a second write command after receiving the first write command, performing, by the controller, a second process in response to the second write command, which is either a write command to write records to an entire target track or an erase command to delete at least one user record, the second process comprising:

(b1) processing, by the controller, the received second write command, (b2) in synchronization with processing the received erase command, determining, by the controller, whether the user record exists in a target track, which is a virtual track that conforms to the received second write command, and when the result of the determination of (b2) is negative, executing, by the controller, (b3) and (b4) as follows:

(b3) updating, by the controller, the track management information to information denoting that the user record is not written to the target track, and (b4) determining, by the controller, whether the user record exists in the actual page allocated to the virtual page comprising the target track, based on the track management information updated in (b3), and when the result of the determination of (b4) is negative, the actual page allocated to the virtual page comprising the target track is configured only from tracks that do not comprise the user record, and the controller cancels the allocation of the actual page to the virtual page, wherein when the result of the determination of (b2) is affirmative, the controller does not execute (b3) and (b4).

11. A storage control apparatus of a mainframe system, which is coupled to a host apparatus of a mainframe system and a physical storage device group that is the basis of a pool, the storage control apparatus comprising:

a storage resource; and a processor coupled to the storage resource, wherein the pool is configured from a plurality of actual pages, and each actual page is configured from a plurality of actual tracks, each of the plurality of actual tracks including a first track, the first track not including user data, wherein there is a virtual volume, which is a virtual logical volume to which thin provisioning is applied, the virtual volume is configured from a plurality of virtual pages, and each virtual page is configured from a plurality of virtual tracks corresponding to actual tracks of the plurality of actual tracks, wherein the processor allocates respective actual pages of the plurality of actual pages to respective virtual pages of the plurality of virtual pages, and wherein the storage resource has track management information denoting a virtual track in which there exists at least one user record, each at least one user record including user data used by the host apparatus, wherein when the processor receives a first write command, which is a write command to write one of the user records to a target track, the processor performs a first process in response to the first write command, the first process comprising:

(a1) when an actual page has not been allocated to a virtual page that comprises a target track, which is a virtual track that conforms to the received first write command, the processor allocates any free actual page inside the pool to the virtual page, and (a2) the processor updates the track management information to information denoting that the user record is written to the target track, and writes the user data to an actual track corresponding to the target track, and wherein when the processor receives a second write command after receiving the first write command, the processor performs a second process in response to the second write command, which is either a write command to write records to an entire target track or an erase command to delete at least one user record, the second process comprising:

(b1) the processor processes the received second write command, (b2) in synchronization with processing the received second write command, the processor determines whether the user record exists in a target track, which is a virtual track that conforms to the received second write command, and when the result of the determination of (b2) is negative, (b3) and (b4) are executed as follows:

(b3) the processor updates the track management information to information denoting that the user record is not written to the target track, and (b4) the processor determines whether the user record exists in the actual page allocated to the virtual page comprising the target track, based on the track management information updated in (b3), and when the result of the determination of (b4) is negative, the actual page allocated to the virtual page comprising the target track is configured only from tracks that do not comprise the user record, and the processor cancels the allocation of the actual page to the virtual page, wherein when the result of the determination of (b2) is affirmative, the processor does not execute (b3) and (b4).

* * * * *